(12) United States Patent
Yoo et al.

(10) Patent No.: US 9,958,260 B2
(45) Date of Patent: May 1, 2018

(54) APPARATUS AND METHOD FOR EXTRACTING FEATURE POINT FOR RECOGNIZING OBSTACLE USING LASER SCANNER

(71) Applicants: Hyundai Motor Company, Seoul (KR); Kia Motors Corporation, Seoul (KR); Industry-Academic Cooperation Foundation, Yonsei University, Seoul (KR)

(72) Inventors: Minkyun Yoo, Seoul (KR); Hyunju Kim, Gyeonggi-Do (KR); Hoon Lee, Seoul (KR); Youngwon Kim, Gyeonggi-Do (KR); Hyungsun Jang, Gyeonggi-Do (KR); Baehoon Choi, Seoul (KR); Beomseong Kim, Seoul (KR); Euntai Kim, Seoul (KR)

(73) Assignees: Hyundai Motor Company, Seoul (KR); Kia Motors Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 1160 days.

(21) Appl. No.: 14/142,054

(22) Filed: Dec. 27, 2013

(65) Prior Publication Data
US 2015/0088456 A1   Mar. 26, 2015

(30) Foreign Application Priority Data
Sep. 25, 2013   (KR) .................. 10-2013-0113659

(51) Int. Cl.
*G01B 5/02* (2006.01)
*G01B 5/14* (2006.01)
(Continued)

(52) U.S. Cl.
CPC ............. *G01B 11/24* (2013.01); *G01B 11/14* (2013.01); *G01S 7/4802* (2013.01);
(Continued)

(58) Field of Classification Search
CPC ....... G01B 11/14; G01B 11/24; G01S 7/4802; G01S 17/023; G01S 17/42; G01S 17/936;
(Continued)

(56) References Cited

U.S. PATENT DOCUMENTS 5,920,382 A * 7/1999 Shimizu ................. G01C 3/085
180/167
8,098,889 B2 * 1/2012 Zhu ....................... B60W 40/02
340/907

(Continued)

FOREIGN PATENT DOCUMENTS

KR   10-2009-0021724   3/2009
KR   10-2009-0126586   12/2009
(Continued)

*Primary Examiner* — David M Gray
*Assistant Examiner* — Geoffrey T Evans
(74) *Attorney, Agent, or Firm* — Mintz Levin Cohn Ferris Glovsky and Popeo, P.C.; Peter F. Corless

(57) ABSTRACT

An apparatus and method for extracting a feature point to recognize an obstacle using a laser scanner are provided. The apparatus includes a laser scanner that is installed at a front of a traveling vehicle and is configured to obtain laser scanner data having a plurality of layers in real time. In addition, a controller is configured to separate the laser scanner data obtained by the laser scanner into a plurality of layers to extract measurement data present in each layer and determine feature points of the measurement data to classify a type of obstacle based on a plurality of stored feature points.

14 Claims, 10 Drawing Sheets

(51) Int. Cl.
    *G01B 7/02*    (2006.01)
    *G01B 7/14*    (2006.01)
    *G01B 11/02*   (2006.01)
    *G01B 11/14*   (2006.01)
    *G01B 13/02*   (2006.01)
    *G01B 21/02*   (2006.01)
    *G01C 22/00*   (2006.01)
    *G01B 11/24*   (2006.01)
    *G01S 17/93*   (2006.01)
    *G01S 7/48*    (2006.01)
    *G01S 17/02*   (2006.01)
    *G01S 17/42*   (2006.01)
    *G06K 9/00*    (2006.01)

(52) U.S. Cl.
    CPC ........... *G01S 17/936* (2013.01); *G01S 17/023* (2013.01); *G01S 17/42* (2013.01); *G06K 9/00805* (2013.01); *G06T 2207/10028* (2013.01); *G06T 2207/20021* (2013.01)

(58) Field of Classification Search
    CPC ...... G06K 9/00805; G06T 2207/10028; G06T 2207/20021
    See application file for complete search history.

(56) References Cited

U.S. PATENT DOCUMENTS

| | | | |
|---|---|---|---|
| 9,613,280 B2* | 4/2017 | Kim | G06K 9/00798 |
| 2004/0117090 A1* | 6/2004 | Samukawa | B60K 31/0008 |
| | | | 701/45 |
| 2005/0219506 A1* | 10/2005 | Okuda | G01S 7/4972 |
| | | | 356/28 |
| 2006/0103927 A1* | 5/2006 | Samukawa | G01S 17/42 |
| | | | 359/436 |
| 2008/0164985 A1* | 7/2008 | Iketani | G01S 7/4802 |
| | | | 340/435 |
| 2008/0166024 A1* | 7/2008 | Iketani | B60R 1/00 |
| | | | 382/107 |
| 2008/0273752 A1* | 11/2008 | Zhu | B60W 40/02 |
| | | | 382/103 |
| 2009/0303026 A1 | 12/2009 | Broggi et al. | |
| 2010/0020074 A1 | 1/2010 | Taborowski et al. | |
| 2010/0239172 A1* | 9/2010 | Akiyama | G06T 7/33 |
| | | | 382/190 |
| 2012/0081542 A1 | 4/2012 | Suk et al. | |
| 2014/0035777 A1* | 2/2014 | Kim | G01S 13/93 |
| | | | 342/146 |
| 2015/0070682 A1* | 3/2015 | Yoo | G01S 17/936 |
| | | | 356/4.01 |
| 2015/0103331 A1* | 4/2015 | Oh | G01S 17/936 |
| | | | 356/6 |
| 2015/0142299 A1* | 5/2015 | Shin | B62D 15/0295 |
| | | | 701/301 |

FOREIGN PATENT DOCUMENTS

| | | |
|---|---|---|
| KR | 10-2009-0130553 A | 12/2009 |
| KR | 10-2010-0093709 A | 8/2010 |
| KR | 10-2012-0034352 A | 4/2012 |
| KR | 10-1268523 B1 | 5/2013 |
| KR | 10-1305695 B1 | 9/2013 |

* cited by examiner

APPARATUS AND METHOD FOR EXTRACTING FEATURE POINT FOR RECOGNIZING OBSTACLE USING LASER SCANNER

This application is based on and claims priority from Korean Patent Application No. 10-2013-0113659, filed on Sep. 25, 2013 in the Korean Intellectual Property Office, the disclosure of which is incorporated herein in its entirety by reference.

BACKGROUND

Field of the Invention

The present invention relates to an apparatus and a method for extracting a feature point to recognize an obstacle using a laser scanner, and more particularly, to an apparatus and a method for extracting a feature point to recognize an obstacle using a laser scanner, that extracts the feature point present in laser scanner data to classify a type of obstacle around a moving body using a multi-layer laser scanner.

Description of the Prior Art

In accordance with generalization of navigation mounted within a vehicle to provide services such as a road guide, an obstacle guide, and the like, research into an algorithm recognizing obstacles such as a vehicle other than the vehicle being driven, a pedestrian, and the like has been continuously conducted. In particular, the vehicle includes a sensor such as a radar sensor, a laser scanner, an image sensor, an ultrasonic sensor, or the like. Since each sensor has merits and demerits, a sensor fusion technology that supplements the demerits of each sensor using two or more sensors has also been developed.

Among the different types of sensors, the laser scanner has high utilization since it may provide more accurate distance information and angle information than other sensors. However, since laser scanner data obtained by the laser scanner may provide only angle and distance information, it may be difficult to classify the obstacles such as the vehicle, the pedestrian, and the like based on the laser scanner data.

SUMMARY

Accordingly, the present invention provides an apparatus and a method for extracting a feature point to recognize an obstacle using a laser scanner, that extracts the feature point present in laser scanner data to classify a type of obstacle present around a moving body using a multi-layer laser scanner.

In one aspect of the present invention, an apparatus for extracting a feature point to recognize an obstacle using a laser scanner may include: a laser scanner installed at a front of a moving body and configured to obtain laser scanner data configured of a plurality of layers in real time; and a controller configured to separate the laser scanner data obtained by the laser scanner into a plurality of layers to extract measurement data present in each layer and determine feature points of the measurement data to classify a type of obstacle based on a plurality of feature points which are pre-stored.

Furthermore, the controller may be configured to determine a form of the measurement data present in the layer and determine the number or position of measurement data present in each layer and whether the layer in which the measurement data is not present is present. The controller may be configured to restore a three-dimensional coordinate value for the measurement data using layer information and calculate a standard deviation of a distance between the moving body and the obstacle using an average value derived from the coordinate value. The controller may be configured to calculate a distance difference up to a virtual plane minimizing a distance from the coordinate values and calculate a summation of an area of each layer in which the coordinate value is present. The controller may further be configured to calculate an average value for an area of each layer in which the coordinate value is present and calculate a gradient of a line segment or a coefficient of a curve generated from the measurement data.

In another aspect of the present invention, a method for extracting a feature point for recognizing an obstacle using a laser scanner may include: obtaining, by a controller, laser scanner data configured of a plurality of layers in real time from a laser scanner installed at a front of a moving body; separating, by the controller, the laser scanner data into a plurality of layers; extracting, by the controller, measurement data present in each layer; and determining, by the controller, feature points of the measurement data to classify a type of obstacle present at the front of the moving body based on a plurality of feature points which are pre-stored.

The determination of the feature points of the measurement data may include determining a form of the measurement data present in the layer and determining the number or position of measurement data present in each layer and whether the layer in which the measurement data is not present is present. The determination of the feature points of the measurement data may further include restoring a three-dimensional coordinate value for the measurement data using layer information and calculating a standard deviation of a distance between the moving body and the obstacle using an average value derived from the coordinate value. Additionally, the determination of the feature points of the measurement data may include calculating a distance difference up to a virtual plane minimizing a distance from the coordinate values, calculating a summation of an area of each layer in which the coordinate value is present, calculating an average value for an area of each layer in which the coordinate value is present, and calculating a gradient of a line segment or a coefficient of a curve generated from the measurement data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
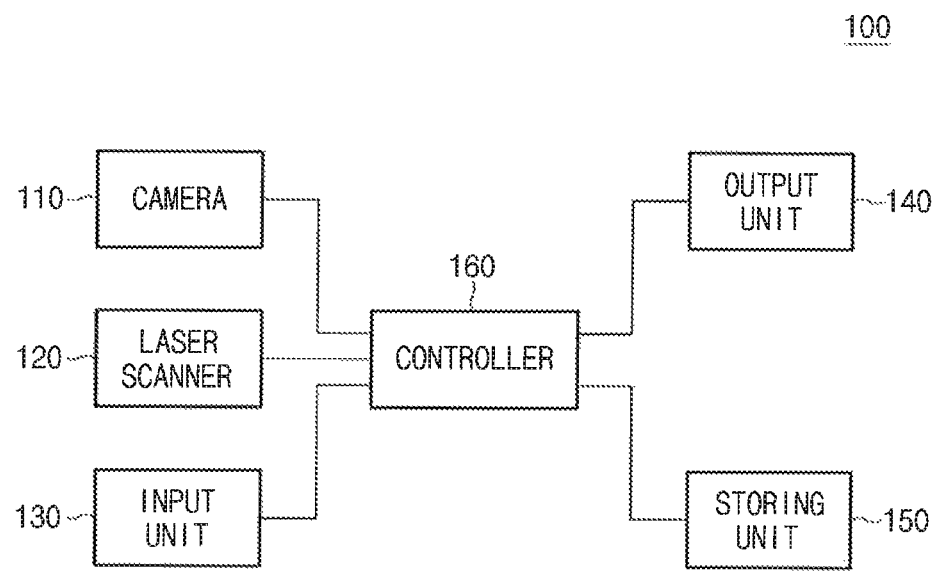
FIG. 1 is an exemplary block diagram showing a main configuration of an apparatus for extracting a feature point to recognize an obstacle using a multi-layer laser scanner according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, %, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in more detail with reference to the accompanying drawings. However, in describing the exemplary embodiment of the present invention, technology contents well known in the art to which the present invention pertains and directly not related to the present invention will be omitted, if possible. This is to more clearly deliver the key point of the present invention so as not to obscure the present invention by omitting any unnecessary description.

FIG. 1 is an exemplary block diagram showing a main configuration of an apparatus for extracting a feature point to recognize an obstacle using a multi-layer laser scanner according to an exemplary embodiment of the present invention.

Referring to FIG. 1, an apparatus 100 (hereinafter, referred to as a feature point extraction apparatus 100) for extracting a feature point to recognize an obstacle using a multi-layer laser scanner according to an exemplary embodiment of the present invention includes an imaging device 110, a laser scanner 120, an input unit 130, an output unit 140, a storing unit 150, and a controller 160. The controller 160 may be configured to execute the imaging device 110, laser scanner 120, input unit 130, output unit 140, and storing unit 150.

The imaging device 110 may be installed at a front of a moving body, that is, a traveling vehicle (e.g., vehicle being driven), to obtain image data with respect to the front of the traveling vehicle at a current location of the traveling vehicle and provide the obtained image data to the controller 160. Further, the laser scanner 120 may be disposed within the traveling vehicle to obtain laser scanner data of the front of the traveling vehicle and provide the obtained laser scanner data to the controller 160. The laser scanner data may include a plurality of multi-layers and may be a multi-layer laser scanner. In particular, the laser scanner 120 may use a light detection and ranging (LiDAR) laser radar, but is not particularly limited thereto, and various types of sensors and laser scanners corresponding thereto may be used.

The input unit 130 may be configured to receive number information and text information, and transfer a key signal input with respect to a function control of the feature point extraction apparatus 100 of a variety of functions to the controller 160. The input unit 130 may be formed by a touch pad or a key pad having a general key arrangement according to a provisioning form of the feature point extraction apparatus 100. The input unit 130 may include a touch screen. In particular, the input unit 130 may be displayed on the output unit 140. According to the exemplary embodiment of the present invention, the input unit 130 may be configured by the touch pad or the touch screen to improve user convenience. The output unit 140 may be configured to display screen data, for example, various menu data, external image data of a front of the traveling vehicle, and the like, generated during running a program by an operation of the controller 160. The storing unit 150 may be configured to store application programs (e.g., a program for each separating a plurality of layers configuring the laser scanner data, a program for extracting the feature point included in the laser scanner data, and the like) necessary to operate functions according to the exemplary embodiment of the present invention.

The controller 160 may be configured to separate the laser scanner data obtained by the laser scanner 120 into the plurality of layers to extract measurement data present in each layer and determine a feature point of the measurement data to classify a type of obstacle based on a plurality of feature points which are pre-stored. More specifically, the controller 160 may be configured to determine a form of the measurement data present in the layer, the number or position of measurement data present in each layer, and whether the layer which does not have the measurement data is present in the layers.

In addition, the controller 160 may be configured to restore a three-dimensional coordinate value for the measurement data using layer information and calculate standard deviation of a distance between the traveling vehicle and the obstacle using an average value derived from the coordinate value. The controller 160 may be configured to calculate a distance difference up to a virtual plane to minimize a distance from the coordinate values and calculate a sum of an area of each layer in which the coordinate value is present. Further, the controller 160 may be configured to calculate an average value of the area of each layer in which the coordinate value is present and calculate a gradient of a line segment or a coefficient of a curve generated from the measurement data. The type of obstacle determined from the laser scanner data may be more accurately classified by the above-mentioned operations in the controller 160.

Figure 2:
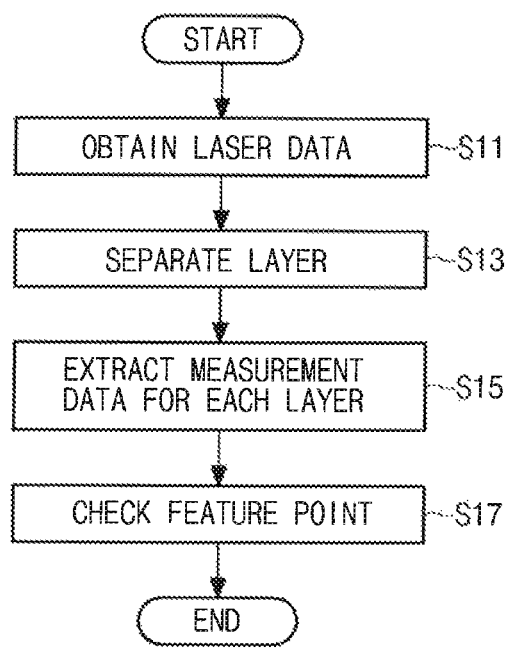
FIG. 2 is an exemplary flow chart for describing a method for extracting a feature point to recognize an obstacle using a multi-layer laser scanner according to an exemplary embodiment of the present invention.

FIG. 2 is an exemplary flow chart describing a method for extracting a feature point to recognize an obstacle using a multi-layer laser scanner according to an exemplary embodiment of the present invention. FIGS. 3 to 10 are exemplary views describing the method for extracting the feature point for recognizing the obstacle using the multi-layer laser scanner according to the exemplary embodiment of the present invention.

Figure 5:
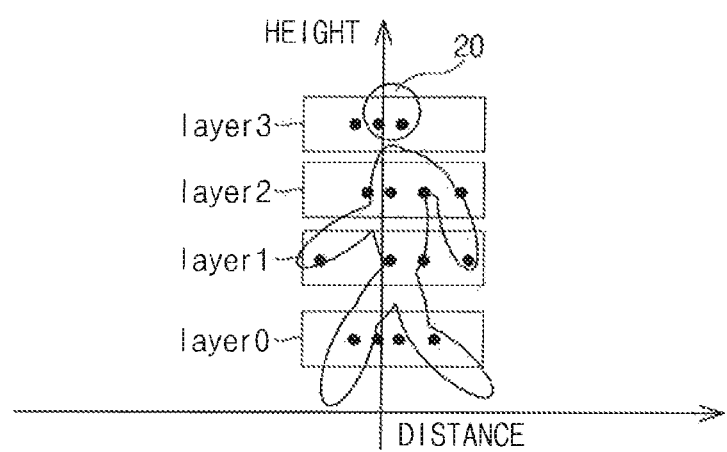
FIGS. 5 and 6 are exemplary views of measurement data present in a plurality of layers that correspond to the feature points according to the exemplary embodiment of the present invention.

Referring to FIGS. 2 to 10, at S11, the controller 160 may be configured to receive the laser scanner data having the plurality of layers obtained by the laser scanner 120 installed at the front of the traveling vehicle which is the moving body. At S13, the controller 160 may be configured to separate the laser data received from the laser scanner 120 into the plurality of layers. The plurality of layers may be configured of the layers having four-stratums of layer 0 to layer 3 as shown in FIG. 5.

At S15, the controller 160 may be configured to analyze the plurality of layers which are separated and extract the measurement data present in each layer. In particular, the measurement data is data formed when the laser collides (e.g., hits, reaches, or the like) with the obstacle. Further, at S17, the controller 160 may be configured to determine the feature point of the measurement data and compare the feature point of the determined measurement data with feature points stored in the storing unit 150. The stored feature points definitions are shown in the following Table 1 and stored feature points may be mapped to (e.g., compared to) a reference value to classify the obstacle that corresponds to the measurement data as a vehicle or a pedestrian.

TABLE 1

| Feature points | Meaning |
|---|---|
| f1 | an L-shape best representing distribution of points |
| f2 | a width in a line axis of a straight line best representing distribution of points |
| f3 | a height in a line axis of a straight line best representing distribution of points |
| f4 | an area in a line axis of a straight line best representing distribution of points |
| f5 | the number of data of layer 0 |
| f6 | the number of data of layer 1 |
| f7 | the number of data of layer 2 |
| f8 | the number of data of layer 3 |
| f9 | the number of layers in which measurement data is present |
| f10 | standard deviation of a distance from an average point of (x, y, z) values |
| f11 | planarity of (x, y, z) values |
| f12 | a summation of area of each layer |
| f13 | an average of area of each layer |
| f14 | gradient of a line segment (linear expression) best representing the number of points |
| f15 | coefficient of a quadratic term of a curve (quadratic expression) best representing the number of points |
| f16 | coefficient of a linear term of a curve (linear expression) best representing the number of points |

More specifically, the controller 160 may be configured to analyze the extracted measurement data and determine a feature point that corresponds to f1. In particular, when the extracted measurement data (reference numeral 10) form a shape similar to an L-shape which is a reference numeral 12 of FIG. 3, $r_{min}$ may be extracted using a point (reference numeral 11) closest to an origin amongst the measurement data. In addition, the controller 160 may be configured to generate a straight line that best represents distribution of the measurement data such as a reference numeral 13 of FIG. 4 and calculate a width, a height, and an area (corresponding to f2, f3, and f4 of Table 1) represented by the measurement data based on the reference numeral 13 to extract a feature which is slightly changed based on a direction of the obstacle. As a result, the controller 160 may be configured to determine an approximate size of the sensed obstacle.

Figure 6:
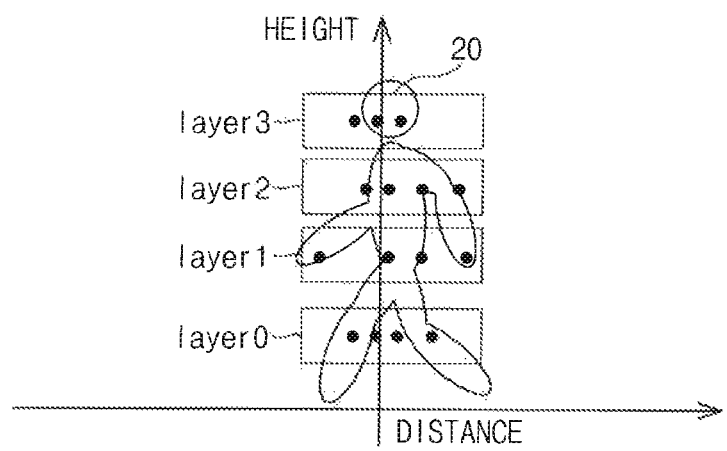

In addition, the controller 160 may be configured to determine the number of measurement data present in layer 0 to layer 3 which are the plurality of layers as shown in FIG. 5 to correspond to the feature points of f5 to f8 of Table 1 and the controller 160 may be configured to determine the number of layers in which the measurement data is present as shown in FIG. 6 to correspond to the feature point of f9 of Table 1. For example, when a moving pedestrian is sensed as the obstacle, the different number of measurement data may be determined for each layer as shown in FIG. 5 and the layer which the measurement data is not present may be present based on a height of the pedestrian.

Figure 7:
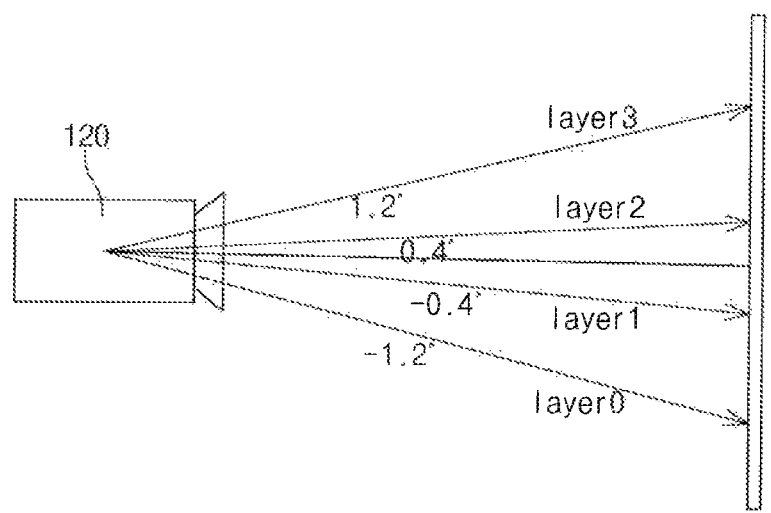
FIGS. 7 and 8 are exemplary views of obstacle coordinates using information in the plurality of layers that correspond to the feature points according to the exemplary embodiment of the present invention.

The controller 160 may be configured to restore x, y, and z coordinates of the obstacle using information layer 0 to layer 3 as shown in FIG. 7 to correspond to the feature point of f10 of Table 1. In particular, although the drawing shows that an angle made by each layer is formed at about 0.8°, the angle may not necessarily be limited thereto and may be modified by those skilled in the art. The controller 160 may be configured to use an average value of the restored x, y, and z values as a standard deviation of a distance between the traveling vehicle and the obstacle. Further, to restore the x, y, and z coordinates of the obstacle, the controller 160 may be configured to use the following Equation 1 and to use the average value of the restored x, y, and z values as the standard deviation of the distance between the traveling vehicle and the obstacle, the controller 160 may be configured to use the following equations.

$$(r, \theta, L) = \begin{cases} x = r*\cos(\theta)*\cos(-1.2+0.8L) \\ y = r*\sin(\theta)*\cos(-1.2+0.8L) \\ z = r*\sin(\theta)(-1.2+0.8L) \end{cases} \quad \text{Equation 1}$$

Wherein r represents a distance from a distance between the laser scanner 120 and one data among the measurement data to the plane, θ represents an angle made by the respective lasers based on the laser scanner 120, and L represents a stratum of the layer.

$$f_{10} = \sqrt{\frac{1}{np}\sum_{n=1}^{np} \|(x, y, z)_n - (x, y, z)_{mean}\|^2} \quad \text{Equation 2}$$

Wherein $n_p$ represents the number of measurement data.

Figure 8:
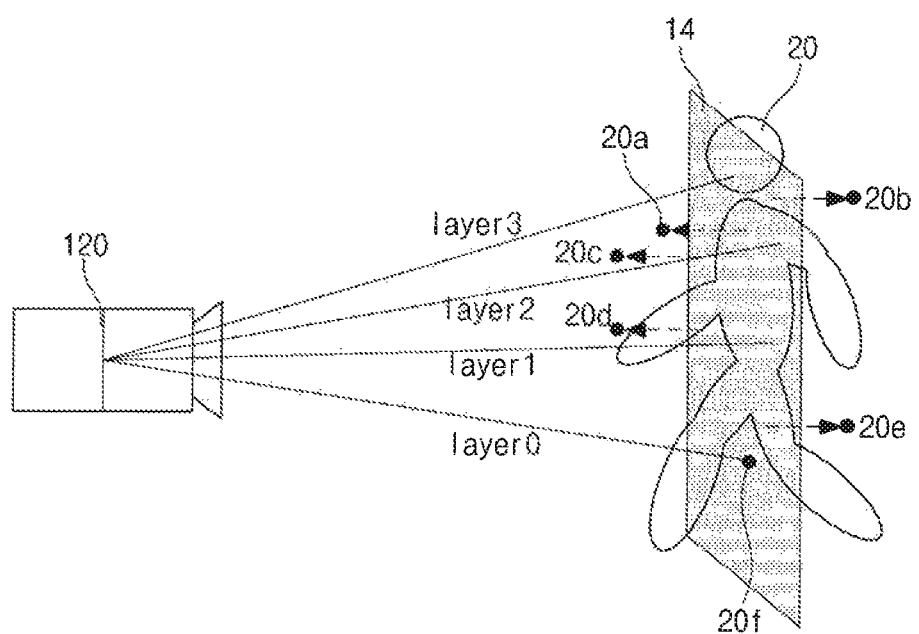

In addition, the controller 160 may be configured to derive planarity of the calculated x, y, and z coordinate values to correspond to the feature point of f11 of Table 1. Therefore, the controller 160 may be configured to calculate a distance difference up to a plane 14 having a minimum distance from points which are reference numerals 20*a* to 20*f* formed by an obstacle 20 as shown in FIG. 8 using the following Equation 3.

$$f_{11} = 1/np \sum_{n=1}^{np} (x_n - P_{1,n})^2 \quad \text{Equation 3}$$

Wherein $x_n$ is a range in which the measurement data is distributed and $P_{1,n}$ is a plane that enables the distance between the measurement data to recognize at a minimum.

Figure 9:
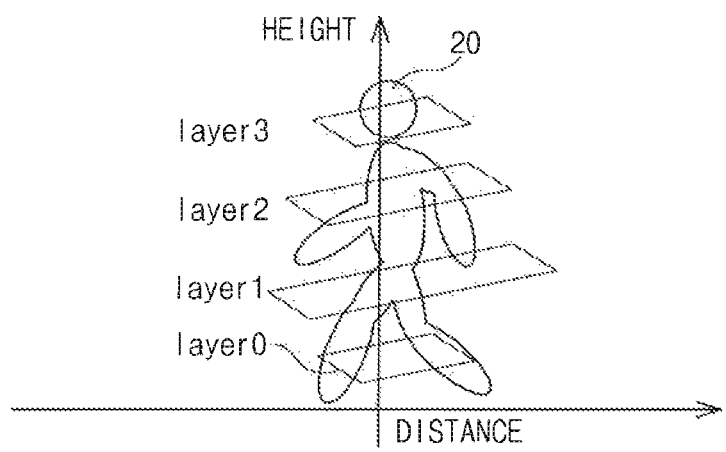
FIG. 9 is an exemplary view illustrating a summation of the area of each layer using the coordinate values in FIGS. 7 and 8 according to the exemplary embodiment of the present invention.
Figure 10:
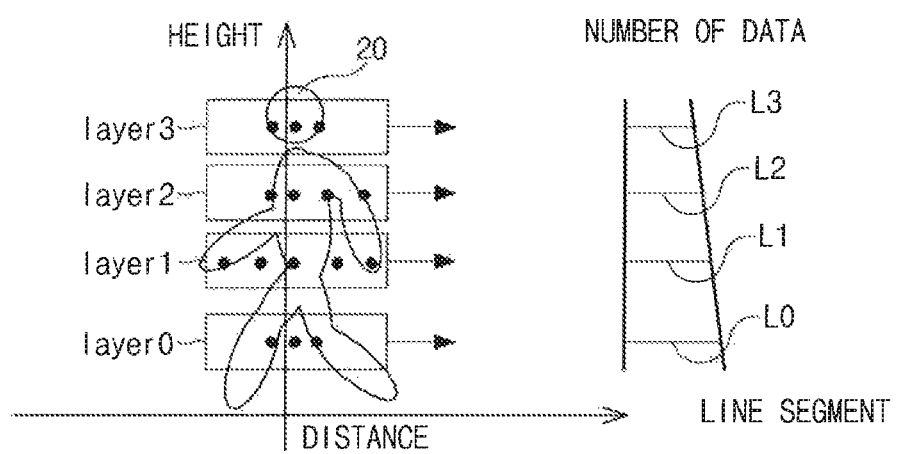
FIG. 10 is an exemplary view illustrating line segments of measurement data present in the plurality of layers corresponding to the feature points according to the exemplary embodiment of the present invention.

The controller 160 may be configured to calculate a summation of the area of each layer using the x, y, and z coordinate values as shown in FIG. 9 to correspond to the feature point of f12 of Table 1 and an average of the area of each layer using the x, y, and z coordinate values as shown in FIG. 9 to correspond to the feature point of f13 of Table 1. Further, the controller 160 may be configured to calculate a gradient of a line segment or a coefficient of a curve using the number of measurement data present in layer 0 to layer 3 such as L0 to L3 as shown in FIG. 10 to correspond to the feature point corresponding to f14 to f16 of Table 1.

Figure 3:
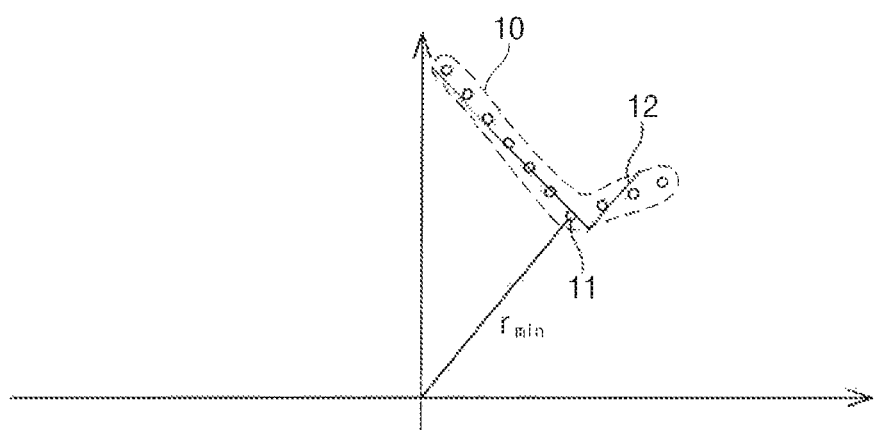
FIG. 3 is an exemplary view describing the method for extracting the feature point to recognize the obstacle using the multi-layer laser scanner in which the extracted measurement data is formed in an L-shape according to the exemplary embodiment of the present invention.
Figure 4:
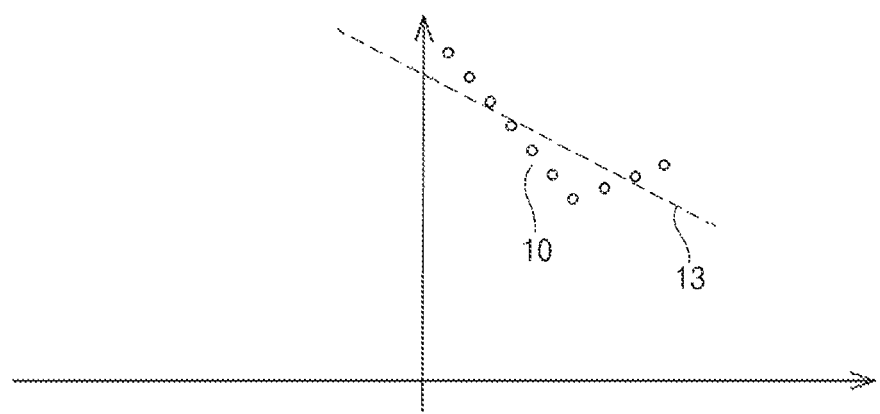
FIG. 4 is an exemplary view of FIG. 3 in which a straight line is generated to illustrate distribution of measurement data according to the exemplary embodiment of the present invention.

More specifically, when the measurement data present in the layer is substantially similar to the L-shape such as the reference numeral 10 of FIG. 3, the controller 160 may be configured to recognize that the measurement data is generated by the vehicle. In addition, since the measurement data present in the layer may be present in each layer as shown in FIG. 5 and the number of measurement data present in each layer may be different, the controller 160 may be configured to recognize that the measurement data is generated by the pedestrian 20. Thus, the controller in the exemplary embodiment of the present invention may be configured to determine the type of obstacle positioned at the front of the traveling vehicle and may determine the number of obstacles more accurately using the feature points extracted by analyzing the measurement data present in the laser scanner data. According to the exemplary embodiment of the present invention, the feature point present in the laser scanner data obtained by the multi-layer laser scanner may be extracted, to classify the type of the obstacle present around the moving body more accurately.

Hereinabove, the apparatus and the method for extracting the feature point to recognize the obstacle using the laser scanner have been described with reference to the exemplary embodiment of the present invention. The exemplary embodiments of the present invention have been disclosed in the present specification and the accompanying drawings and specific terms have been used, but are merely used in a general mean to easily describe the technical content of the present invention and assist in understanding the present invention and do not limit the scope of the present invention. It is obvious to those skilled in the art to which the present invention pertains that various modifications may be practiced based on the technical ideal of the present invention, in addition to the exemplary embodiments disclosed herein.

What is claimed is:

1. An apparatus for extracting a feature to recognize an obstacle using a laser scanner, the apparatus comprising:
    a laser scanner installed at a front of a traveling vehicle and configured to obtain laser scanner data having a plurality of layers in real time; and
    a controller configured to separate the laser scanner data obtained by the laser scanner into a plurality of layers to extract measurement data present in each layer and determine features of the measurement data to classify a type of obstacle based on a plurality of stored features,
    wherein the features comprise at least one of a form of the measurement data present in the layer, a number or position of measurement data present in each layer or whether the layer in which the measurement data is not present is present.

2. The apparatus according to claim 1, wherein the controller is configured to restore a three-dimensional coordinate value for the measurement data using layer information and calculate a standard deviation of a distance between the traveling vehicle and the obstacle using an average value derived from the coordinate value.

3. The apparatus according to claim 1, wherein the controller is configured to calculate a distance difference up to a virtual plane to minimize a distance from the coordinate values.

4. The apparatus according to claim 1, wherein the controller is configured to calculate a summation of an area of each layer in which the coordinate value is present.

5. The apparatus according to claim 1, wherein the controller is configured to calculate an average value for an area of each layer in which the coordinate value is present.

6. The apparatus according to claim 1, wherein the controller is configured to calculate a gradient of a line segment or a coefficient of a curve generated from the measurement data.

7. A method for extracting a feature to recognize an obstacle using a laser scanner, the method comprising:
    obtaining, by a controller, laser scanner data having a plurality of layers in real time from the laser scanner installed at a front of a traveling vehicle;
    separating, by the controller, the laser scanner data into a plurality of layers;
    extracting, by the controller, measurement data present in each layer; and
    determining, by the controller, features of the measurement data to classify a type of obstacle present at the front of the traveling vehicle based on a plurality of stored features, wherein the features comprise at least one of a form of the measurement data present in the layer, a number or position of measurement data present in each layer or whether the layer in which the measurement data is not present is present.

8. The method according to claim 7, wherein the determination of the features of the measurement data includes:
   restoring, by the controller, a three-dimensional coordinate value for the measurement data using layer information; and
   calculating, by the controller, a standard deviation of a distance between the traveling vehicle and the obstacle using an average value derived from the coordinate value.

9. The method according to claim 7, wherein the determination of the features of the measurement data includes:
   calculating, by the controller, a distance difference up to a virtual plane to minimize a distance from the coordinate values.

10. The method according to claim 7, wherein the determination of the features of the measurement data includes:
    calculating, by the controller, a summation of an area of each layer in which the coordinate value is present.

11. The method according to claim 7, wherein the determination of the features of the measurement data includes:
    calculating, by the controller, an average value for an area of each layer in which the coordinate value is present.

12. The method according to claim 7, wherein the determination of the features of the measurement data includes:
    calculating, by the controller, a gradient of a line segment or a coefficient of a curve generated from the measurement data.

13. A non-transitory computer readable medium containing program instructions executed by a controller, the computer readable medium comprising:
    program instructions that obtain laser scanner data having a plurality of layers in real time from a laser scanner installed at a front of a traveling vehicle;
    program instructions that separate the laser scanner data into a plurality of layers;
    program instructions that extract measurement data present in each layer; and
    program instructions that determine features of the measurement data to classify a type of obstacle present at the front of the traveling vehicle based on a plurality of stored features,
    wherein the features comprise at least one of a form of the measurement data present in the layer, a number or position of measurement data present in each layer or whether the layer in which the measurement data is not present is present.

14. The non-transitory computer readable medium of claim 13 further comprising:
    program instructions that restore a three-dimensional coordinate value for the measurement data using layer information and calculate a standard deviation of a distance between the traveling vehicle and the obstacle using an average value derived from the coordinate value.

* * * * *